United States Patent
Pniewski et al.

(10) Patent No.: US 10,900,538 B2
(45) Date of Patent: Jan. 26, 2021

(54) PRESSURE RELIEF FOR AIR SPRINGS

(71) Applicant: Continental Automotive Systems, Inc., Auburn Hills, MI (US)

(72) Inventors: Garrett Mark Pniewski, Bloomfield Hills, MI (US); Sunny Makkar, Troy, MI (US); Kranti Kiran Manga, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 89 days.

(21) Appl. No.: 16/173,261

(22) Filed: Oct. 29, 2018

(65) Prior Publication Data

US 2020/0132154 A1    Apr. 30, 2020

(51) Int. Cl.
*B60G 17/04* (2006.01)
*F16F 9/43* (2006.01)
(Continued)

(52) U.S. Cl.
CPC .............. *F16F 9/437* (2013.01); *B60G 11/27* (2013.01); *B60G 17/0424* (2013.01);
(Continued)

(58) Field of Classification Search
CPC ................ B60G 11/27; B60G 17/0424; B60G 17/0485; B60G 17/0528; B60G 17/0521;
(Continued)

(56) References Cited

U.S. PATENT DOCUMENTS

| 4,443,026 A * | 4/1984 | Harrison ................ B60G 17/04 |
| | | 280/6.159 |
| 5,449,194 A * | 9/1995 | Wernimont .......... B60G 17/005 |
| | | 280/124.112 |

(Continued)

FOREIGN PATENT DOCUMENTS

| DE | 4018712 A1 | 12/1991 |
| DE | 102004048830 B3 | 10/2005 |

(Continued)

OTHER PUBLICATIONS

International Search Report and Written Opinion dated Feb. 18, 2020 from corresponding International Patent Application No. PCT/US2019/058154.

*Primary Examiner* — James A English

(57) ABSTRACT

An air spring assembly having pressure relief capability, where the air spring assembly includes a single air volume, or a multi-chamber air volume. When the air spring assembly is operating at a stiffer spring rate in combination with a setting to increase ground clearance, during certain road events, the air spring assembly is compressed, and the pressure in the air spring assembly increases. In order to not exceed the safe mechanical limits of the air spring assembly, the pressure is limited to a maximum value when full compression is achieved. The air spring assembly includes at least one valve, which is opened based on a "cracking pressure," which is determined based on the mechanical limits of the air spring assembly. This facilitates the operation of the air spring assembly at settings to increase ground (Continued)

clearance of the vehicle, while allowing for pressure relief when the mechanical limit is reached.

10 Claims, 8 Drawing Sheets

(51) Int. Cl.
    *B60G 11/27*     (2006.01)
    *B60G 17/048*     (2006.01)
    *B60G 17/052*     (2006.01)
    *F16F 9/04*     (2006.01)

(52) U.S. Cl.
    CPC ..... *B60G 17/0485* (2013.01); *B60G 17/0528* (2013.01); *F16F 9/0436* (2013.01); *B60G 2202/152* (2013.01); *B60G 2400/51222* (2013.01); *B60G 2500/204* (2013.01); *F16F 2230/06* (2013.01); *F16F 2234/02* (2013.01)

(58) Field of Classification Search
    CPC .......... B60G 17/0155; B60G 2202/152; B60G 2400/51222; B60G 2500/204; B60G 2500/30; B60G 2500/22; B60G 2500/2044; B60G 2206/42; F16F 9/0436; F16F 9/43; F16F 9/512; F16F 2230/06; F16F 2234/02
    See application file for complete search history.

(56) References Cited

U.S. PATENT DOCUMENTS

| | | | |
|---|---|---|---|
| 6,698,730 B2* | 3/2004 | Easter | B60G 17/0528 267/64.28 |
| 2012/0153581 A1* | 6/2012 | Li | B60G 17/0195 280/5.514 |
| 2013/0207355 A1* | 8/2013 | Pavuk | F16F 9/049 280/5.512 |
| 2015/0001825 A1* | 1/2015 | Kazimiers | B60G 9/02 280/124.112 |
| 2017/0341480 A1* | 11/2017 | Oishi | B60G 11/27 |
| 2018/0222275 A1* | 8/2018 | Reuter | B60G 17/0523 |
| 2019/0070921 A1* | 3/2019 | Meier | B60G 17/056 |
| 2020/0164710 A1* | 5/2020 | Crane | B60G 17/0528 |

FOREIGN PATENT DOCUMENTS

| | | |
|---|---|---|
| DE | 102005054370 A1 | 5/2007 |
| DE | 102013107826 A1 | 1/2015 |
| EP | 3184331 A1 | 6/2017 |
| WO | 2013/165238 A1 | 11/2013 |

\* cited by examiner

PRESSURE RELIEF FOR AIR SPRINGS

FIELD OF THE INVENTION

The invention relates generally to an air spring assembly having a pressure relief capability, which prevents the air spring assembly from being exposed to excessively high pressures, which may occur during road events in which partial or full compression is achieved due to high levels to suspension travel.

BACKGROUND OF THE INVENTION

Suspension systems for automotive vehicles provide vehicle passengers with a more comfortable ride. Aft suspension systems utilize air springs, rather than traditional coil springs, and provide different suspension qualities that may be preferable to traditional coil spring suspensions in some vehicles.

A conventional air spring is a device that is arranged between a vehicle body and chassis. The typical air spring has at least one working space, or cavity that is filled with compressed air generated by a compressor. The cavity filled with compressed air at least partially fills a bellow, and other surrounding cavities. There are also air suspension systems in which the air pressure is adjustable such that the ride height of the vehicle and the spring rate of each air spring may be adjusted. Some air suspension systems are used with vehicles having off-road capability. These off-road vehicles often operate under conditions where the suspension jounce is maximized, and the pressure in each air spring increases during compression travel. Other instances where it may be beneficial to increase the ride height of the vehicle include traveling up or down steep ramps in a parking garage. Because the air mass (which is a product of pressure and volume) in each air spring may be adjusted to increase both the ride height and the spring rate, there may be situations where the air pressure inside one or more of the air springs reaches undesirable levels when the suspension travel of one or more of the air springs is maximized. If the air spring is not equipped to accommodate an undesirable increase in pressure due to these conditions, damage to the air spring may occur.

Accordingly, there exists a need for the ability to limit the maximum pressure an air spring assembly is exposed to during vehicle travel, specifically during certain events when suspension travel is maximized, or the vehicle load is high enough to have a high spring pressure, such that damage to the air spring assembly due to excessive pressure is minimized or eliminated.

SUMMARY OF THE INVENTION

In one embodiment, the present invention is an air spring assembly having pressure relief capability. The pressure relief function may be used as part of an air spring assembly having a single air volume, or as part of a multi-chamber air spring.

In an embodiment where the pressure relief capability of the pressure invention is incorporated into a multi-chamber air spring, it is possible to select a spring rate which is rigid, soft, or somewhere in between. The stiffer spring rate is achieved by reducing the air spring volume by closing either a mechanical or an electro-mechanical valve. When the air spring assembly is operating at a stiffer spring rate in combination with a setting to increase ground clearance (such that the vehicle is better suited for off-road travel), during certain road events which occur during off-road travel, the air spring assembly is compressed, and the pressure in the air spring assembly increases. In order to not exceed the safe mechanical limits of the air spring assembly, the pressure is limited to a maximum allowable value during a road event in which full compression is achieved. The maximum pressure is determined by the desired vehicle height setting (which increases the wheel travel and hence the maximum pressure) and vehicle load.

Different types of valves may be used to control the maximum amount of pressure in the air spring assembly. In one embodiment, the valve is a mechanical valve, and in another embodiment, the valve is an electromechanical valve.

In one embodiment, the mechanical valve is opened (or the electromechanical valve is energized) based on a "cracking pressure." The cracking pressure is determined based on the mechanical limits of the air spring assembly. Once the valve is opened (or energized), the pressure in the air spring is reduced. This facilitates the operation of the air spring assembly at higher settings to increase ground clearance of the vehicle, while allowing for pressure relief when the mechanical limit is reached.

There are several possible configurations and modes of operations of the air suspension system incorporating pressure relief capability, according to the present invention.

Below is a list of non-limiting potential configurations:

Scenario-1: In a single chamber system, a valve in the compressor is opened "electronically" when the pressure in the air spring assembly is above a predetermined maximum amount, transferring air back into the reservoir.

Scenario-2: In a single chamber system, the valve (either mechanically or electronically) is used to transfer air to atmosphere when the pressure in the air spring assembly is above a predetermined maximum amount.

Scenario-3: In a multi-chamber system, the valve in the compressor is opened "electronically" when the pressure in the air spring assembly is above a predetermined maximum amount, transferring air back into the reservoir.

Scenario-4: In a multi-chamber system, the valve (either mechanically or electronically) is used to transfer air to atmosphere when the pressure in the air spring assembly is above a predetermined maximum amount.

Scenario-5: In a multi-chamber system, the valve (either mechanically or electronically) is used to transfer air to another chamber internally, when the pressure in the air spring assembly is above a predetermined maximum amount.

One of the advantages of incorporating the pressure relief capability of the present invention is the ability for the air spring assembly to operate at higher pressure settings, and have an overall increased range of operation without risk of mechanical damage or durability concerns. The pressure relief capability of the present invention helps to make the benefits of air suspension, such as higher ground clearance, capability for higher vehicle loads, and/or increase suspension travel, more perceivable to the end customer.

Another advantage of the pressure relief capability of the present invention is that, with regard to the scenarios mentioned above where the air is transferred to the reservoir when excess pressure occurs, no reduction of air mass takes place within the air spring assembly, since the air is not exhausted to atmosphere but stored in the closed system. This retains the level speed benefits of a constant air mass system and also provides increased leveling range. When the air suspension system is configured such that the vehicle has higher ground clearance, it is highly desirable to have a stiff spring rate to improve roll stability.

In one embodiment, the present invention is an air suspension system having a maximum pressure relief function. The air suspension system includes at least one air spring assembly, and may include additional air spring assemblies, depending on the type of vehicle incorporating the air suspension system of the present invention.

The air spring assembly includes a bellow, a first cavity formed as part of the bellow, a top cap connected to the bellow, and a second cavity formed as part of the top cap. A first valve is in fluid communication with the first cavity and the second cavity, at least one venting valve in fluid communication with the first valve, and a reservoir in fluid communication with the first valve.

During a first mode of operation, the air spring assembly is configured such that the venting valve is in a closed position, and when pressure in the first cavity and the second cavity is above a predetermined maximum value, the first valve is placed in an open position such that air from the first cavity and the second cavity is vented to the reservoir.

During a second mode of operation, the air spring assembly is configured such that when pressure in the first cavity and the second cavity is above a predetermined maximum value, the first valve and the venting valve are both placed in an open position, such that air from the first cavity and the second cavity is vented to the atmosphere.

An air compressor is in fluid communication with first valve and the reservoir. The air compressor is used for increasing the pressure in the first cavity and the second cavity, and during the first mode of operation, air from the first cavity and the second cavity passes through the first valve, through the air compressor, and into the reservoir.

In an alternate embodiment, the air spring assembly includes a secondary valve in fluid communication with the first cavity and the second cavity, such that the secondary valve allows or disallows air flow between the first cavity and the second cavity. During a third mode of operation, the air spring assembly is configured such that the venting valve is in a closed position, the first valve is in a closed position, and when pressure in the first cavity is above a predetermined maximum value, the secondary valve is placed in an open opposition such that air from the first cavity is vented to the second cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
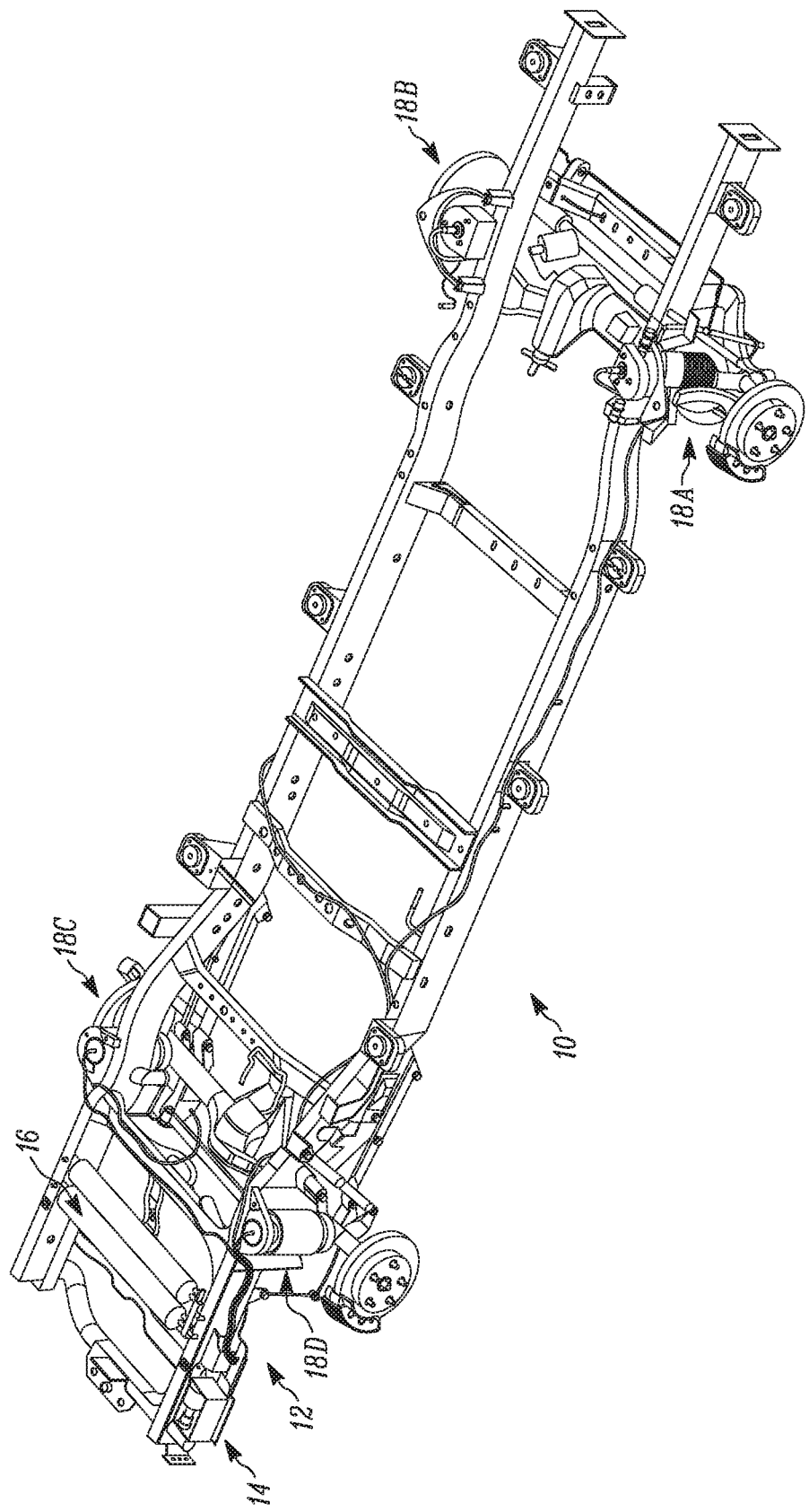
FIG. 1 is a perspective view of various components of a vehicle used as part of an air suspension system, according to embodiments of the present invention.

A chassis of a vehicle having an air suspension system incorporating pressure relief for each air spring assembly is shown in FIG. 1 generally at 10. The air suspension system, shown generally at 12, includes an air compressor 14, which is in fluid communication with a reservoir, shown generally at 16, and the air compressor 14 is also in fluid communication with four air spring assemblies 18A-18D. Each of the air spring assemblies 18A-18D is used for absorbing impact during travel of the vehicle. The first air spring assembly 18A is shown in FIG. 2, however, it is within the scope of the invention that the remaining air spring assemblies 18B-18D have similar components.

Figure 2:
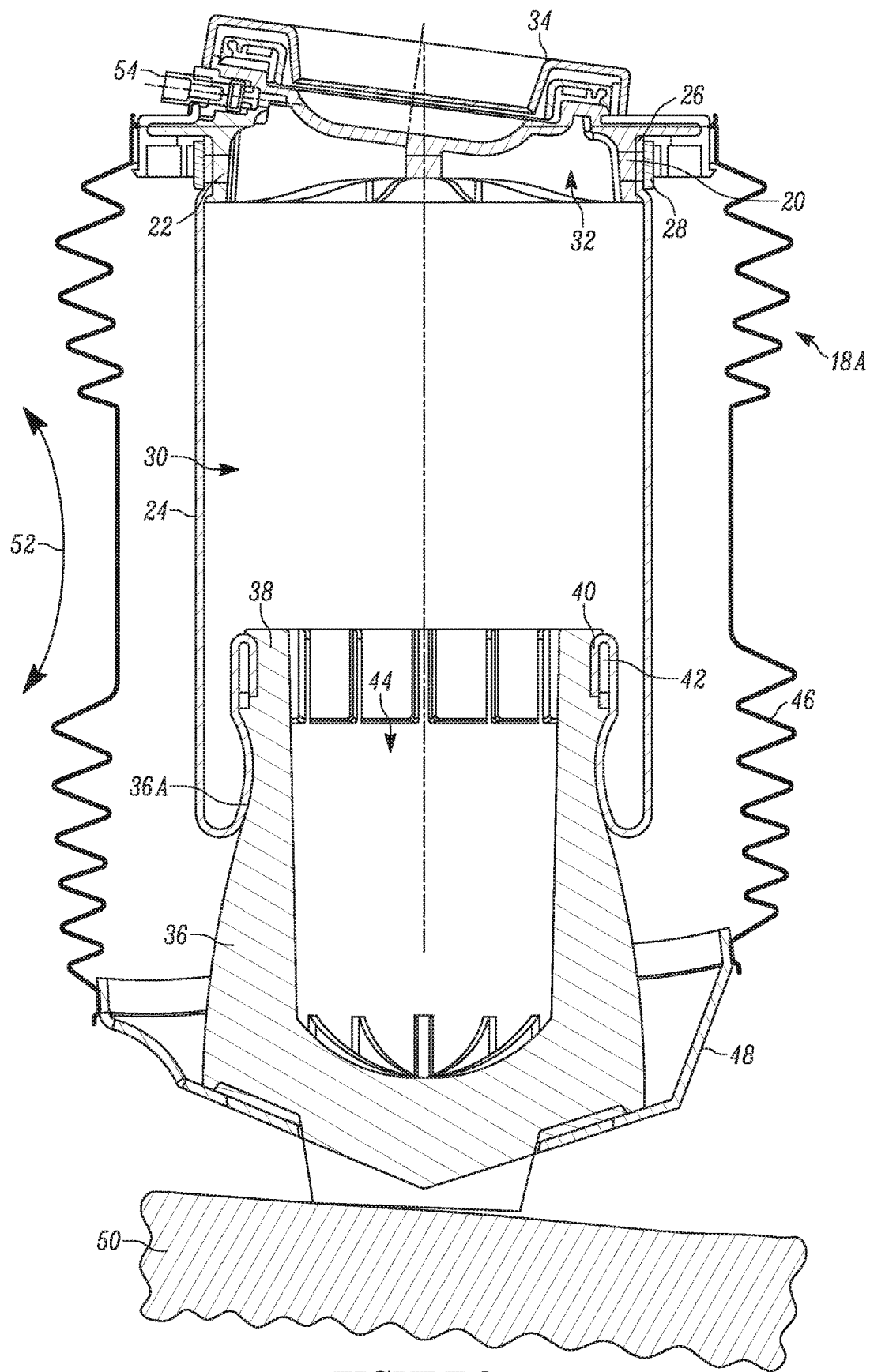
FIG. 2 is a sectional view of a first embodiment of an air spring assembly having a pressure relief function, used as part of an air suspension system, according to embodiments of the present invention.

Referring now to FIG. 2, the air spring assembly 18A includes a top cap 20, and the top cap 20 includes an outer flange 22. The air spring 18A also includes a bellow 24, which is flexible and able to change shape during vehicle travel. A free end 26 of the bellow 24 is clamped between a clamping ring 28 and a portion of the outer flange 22. The bellow 24 includes a cavity, shown generally at 30, which is generally filled with air, and is in fluid communication with another cavity, shown generally at 32, formed as part of the top cap 20.

The top cap 20 includes an upper housing portion 34, and the upper housing portion 34 is connected to another component of a vehicle, such the frame (not shown) of the vehicle, but it is within the scope of the invention that the upper housing portion 34 may be connected to other components of the vehicle as well.

The air spring assembly 18A in this embodiment also includes a piston 36 having an upper extension 38. The other free end 40 of the bellow 24 is clamped between the upper extension 38 and a second clamping ring 42. The piston 36 also includes a cavity, shown generally at 44, which is also generally filled with air, and is in fluid communication with the other cavities 30,32. The cavities 30,32,44 define a first volume of air, which changes during vehicle travel, as the piston 36 moves relative to the top cap 20. A portion of the bellow 24 also extends around the second clamping ring 42, and because of the pressure inside the cavities 30,32,44, a portion of the outer surface of the bellow 24 is pressed against part of the outer surface 36A of the piston 36. The outer surface 36A functions as a contour shell, which defines a portion of the shape of the bellow 24 as the bellow 24 moves during operation of the air spring assembly 18A.

The air spring assembly 18A also includes a gaiter 46, shown in FIG. 2, which is connected to a lower cover 48 and the top cap 20. The lower cover 48 is also connected to the piston 36. The lower cover 48 and the gaiter 46 provide protection for the air spring assembly 10 against dirt and debris during vehicle travel.

The piston 36 is connected to another part of the suspension system of the vehicle, such as the vehicle axle 50. As the axle 50 moves from (operation of the vehicle) the piston 36 moves along the arc-shaped path indicated by the arrow 52. The piston 36 moves along the arc-shaped path 52, which corresponds to the articulation of the axle 50 relative to the rest of the vehicle, and the volume of the cavities 30,32,44 changes during vehicle travel, as the piston 36 moves along the arc-shaped path 52.

Figure 3:
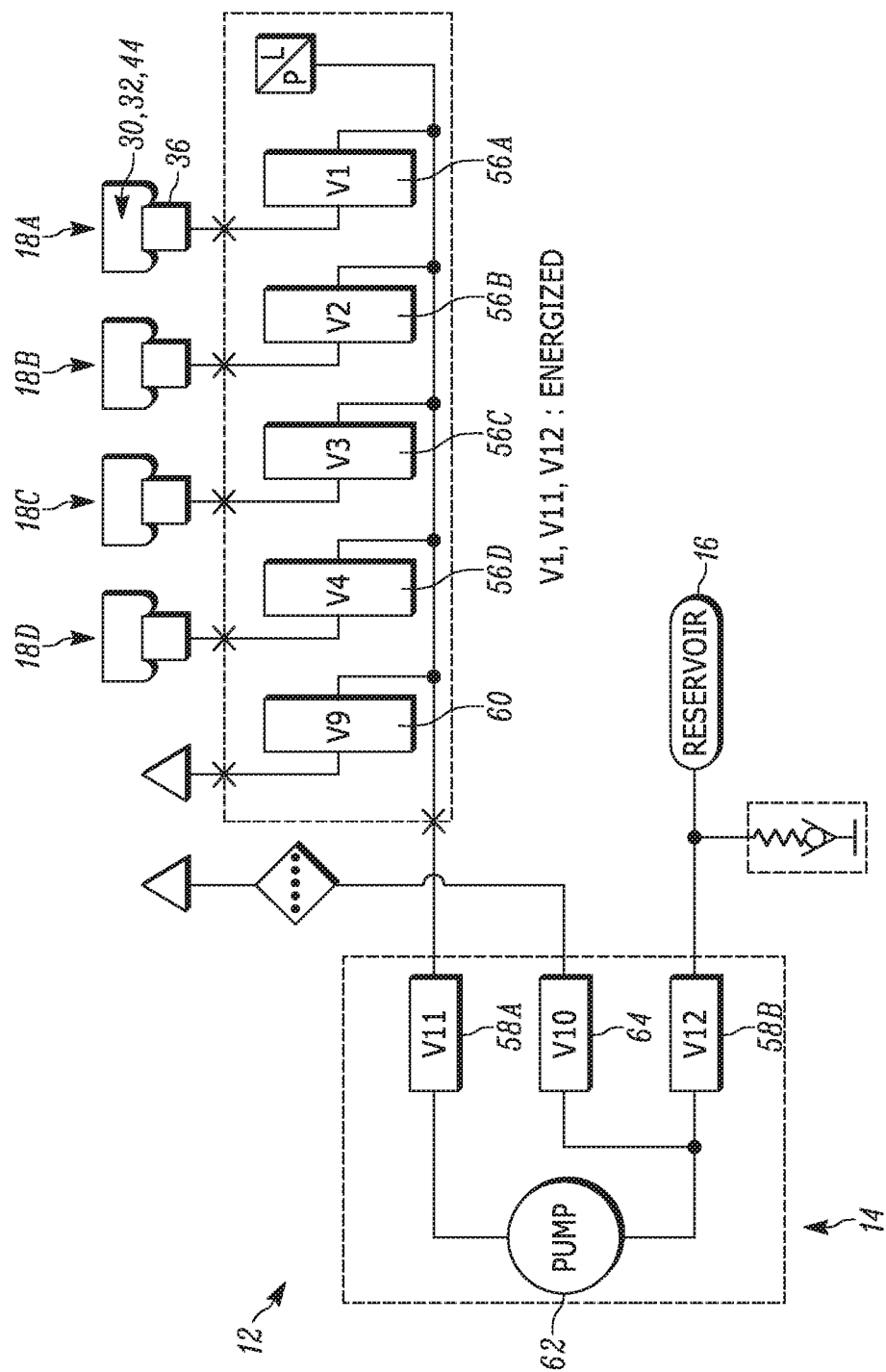
FIG. 3 is a diagram of a first embodiment of an air suspension system in a first mode of operation, according to embodiments of the present invention.

Connected to the top cap 20 is a fitting 54, which is in fluid communication with the cavities 30,32,44. Referring now to FIG. 3, a schematic of the air suspension system 12 is shown, including several valves along with the air compressor 14, and the reservoir 16, which are part of the air suspension system 12, and the fitting 54 is in fluid communication with one of the valves. More specifically, the fitting 54 (shown in FIG. 2) is in fluid communication with a first valve 56A (shown in FIG. 3), and the first valve 56A is in fluid communication with a first control valve 58A, which is part of the air compressor 14. The first valve 56A allows or prevents air flow into the cavities 30,32,44. There are additional valves 56B,56C,56D shown in FIG. 3, which control the flow of air into the corresponding air volumes for each of the additional air spring assemblies 18B,18C,18D, where the piston and air volume of each air spring assembly is shown schematically in FIG. 3. There is also a venting valve 60 in fluid communication with each of the valves 56A,56B,56C,56D,58A and in fluid communication with the atmosphere. Each of the valves 56A,56B,56C,56D is in fluid communication with both the venting valve 60 and the first control valve 58A.

The air compressor 14 also includes a second control valve 58B, the second control valve 58B is in fluid communication with the reservoir 16, and both the control valves 58A,58B are in fluid communication with a pump 62. While is it shown that each of the control valves 58A,58B are part of the air compressor 14, it is within the scope of the invention that each of the control valves 58A,58B may be located in a separate housing, in a separate location from the air compressor 14, while still performing the same function. The air compressor 14 also includes another valve 64, which is in fluid communication with the pump 62, the second control valve 58B, and the atmosphere.

The valves 56A,56B,56C,56D,58A,58B,60,64 as described are electromechanical solenoid type valves, which default to a closed position when they are not energized, and change to an open position when energized. It is also within the scope of the invention that the valves 56A,56B,56C,56D may also be mechanical valves, such as a check valve, which default to a closed position, and open when a maximum amount of pressure in the cavities 30,32,44 is reached.

During travel of the vehicle, the air compressor 14 and the valve 56A are used to configure the air pressure in the cavities 30,32,44 such that the air spring assembly 18A provides the desired ride quality, and the vehicle is traveling at the desired ride height.

FIG. 3 depicts an example of one mode of operation of the air suspension system 12, where the air suspension system 12 is configured to provide pressure relief of the first air spring assembly 18A. Pressure relief may become necessary when the vehicle is travelling off-road, and suspension travel of the air spring assembly 18A is maximized (i.e., fully compressed). During travel of the vehicle, if the pressure in the cavities 30,32,44 of the first air spring assembly 18A increases to a level above a predetermined maximum allowable amount (referred to as "cracking pressure"), in the example shown in FIG. 3, the first valve 56A, and the control valves 58A,58B are all energized, such that the first valve 56A and the control valves 58A,58B are placed in an open position, and the remaining valves 56B,56C,56D,60,64 are in a closed position. This allows air in the cavities 30,32,44 to pass through the first valve 56A, through the first control valve 58A, the pump 62, the second control valve 58B, and into the reservoir 16. The valves 56A,58A,58B may be opened at any time during operation of the vehicle when the pressure in the cavities 30,32,44 of the first air spring assembly 18A is above a predetermined maximum allowable value.

A variation of the mode of operation shown in FIG. 3, where the pressure in the cavities 30,32,34 is less than the pressure in the reservoir 16 such that overflow of air to reduce pressure is not possible. In this instance, the pump 62 is activated, such that air is prevented from flowing into the reservoir 16, but rather the air flows from the reservoir 16 through the second control valve 58B, the pump 62, the first control valve 58A, through the first valve 56A and into the cavities 30,32,44.

Figure 4:
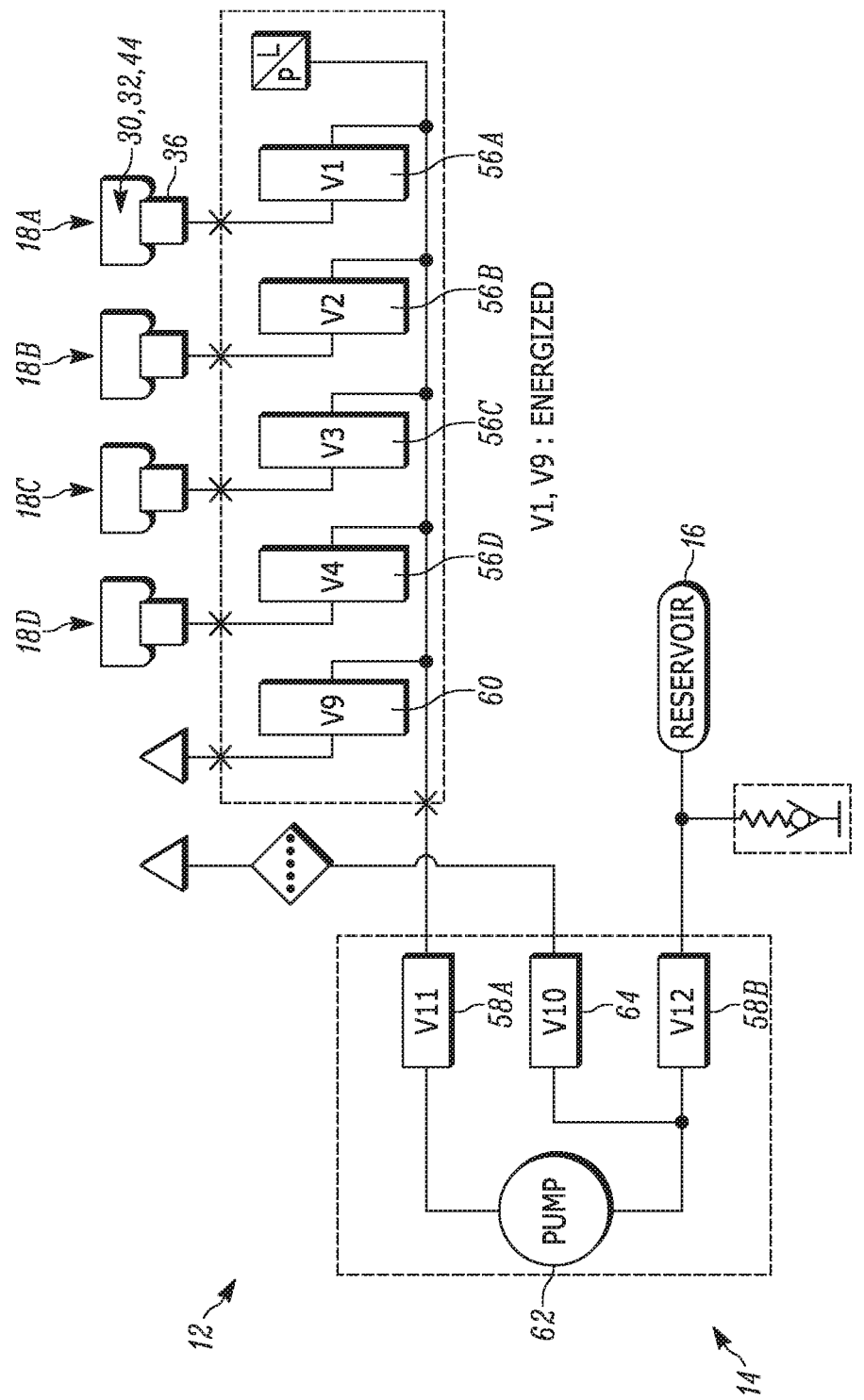
FIG. 4 is a diagram of a first embodiment of an air suspension system in a second mode of operation, according to embodiments of the present invention.

Another example of a different mode of operation of the air suspension system 12 is shown in FIG. 4, where the first valve 56A and the venting valve 60 are both energized, such that the first valve 56A and the venting valve 60 are both in an open position, and the remaining valves 56B,56C,56D, 58A,58B,64 are in a closed position. This allows air in the cavities 30,32,44 to pass through the first valve 56A, through the venting valve 60, and into the atmosphere. The valves 56A,60 may be opened at any time during operation of the vehicle when the pressure in the cavities 30,32,44 of the first air spring assembly 18A is above the predetermined maximum allowable value.

Furthermore, the control valves 58A,58B or the venting valve 60 may be used in combination with any of the valves 56A,56B,56C,56D to control the maximum pressure in the cavities 30,32,44 of each of the air spring assemblies 18A, 18B,18C,18D. Also, more than one of the valves 56A,56B, 56C,56D may be opened simultaneously in combination with the control valves 58A,58B or the venting valve 60 to provide pressure relief to one or more of the air spring assemblies 18A,18B,18C,18D. In other embodiments, there may be various configurations or arrangements of valves which are able to control the maximum pressure in the cavities 30,32,44 of each of the air spring assemblies 18A, 18B,18C,18D, such that the air is transferred to the reservoir 16 or the atmosphere.

Figure 5:
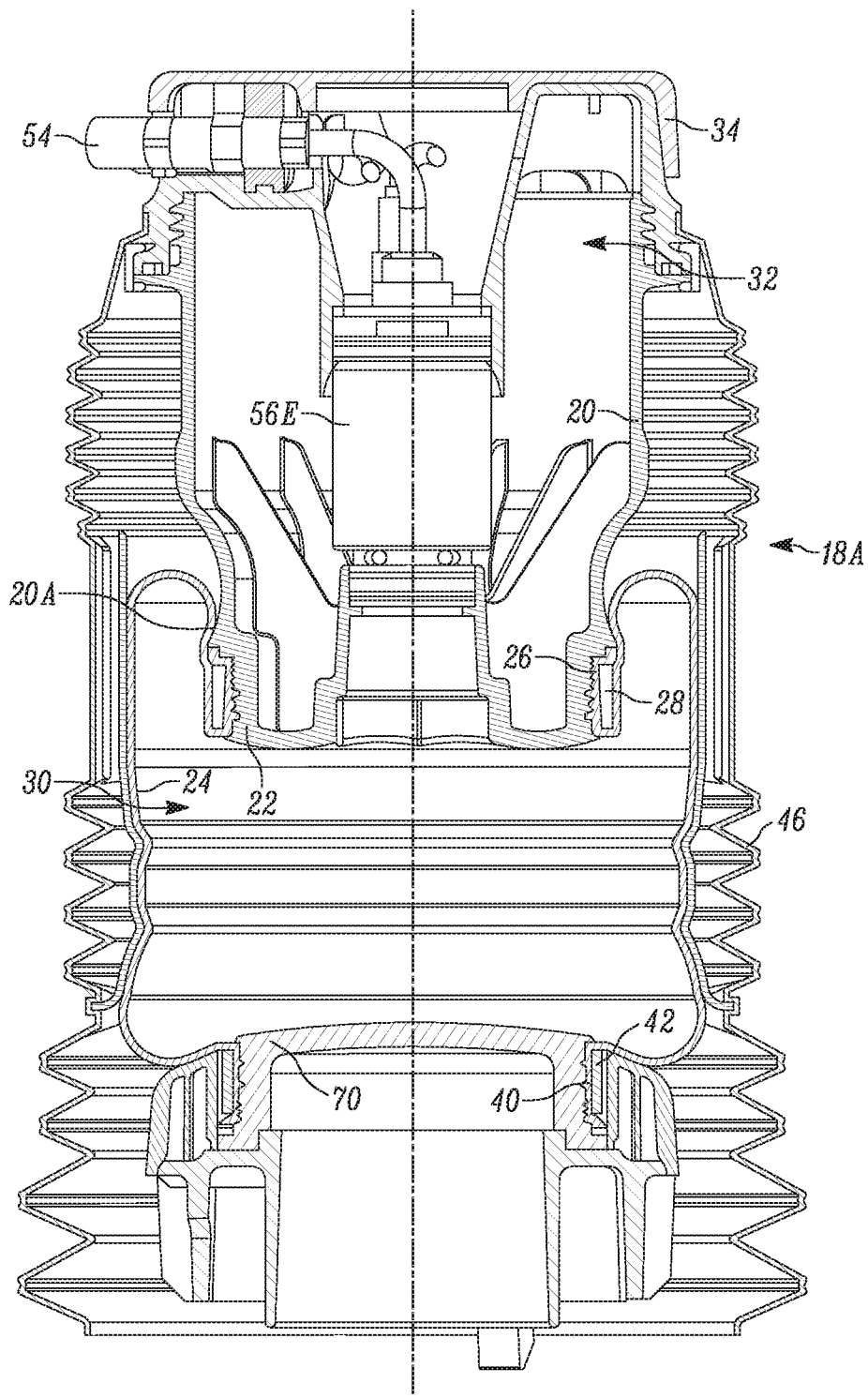
FIG. 5 is a sectional view of a second embodiment of an air spring assembly having a pressure relief function, used as part of an air suspension system, according to embodiments of the present invention.
Figure 6:
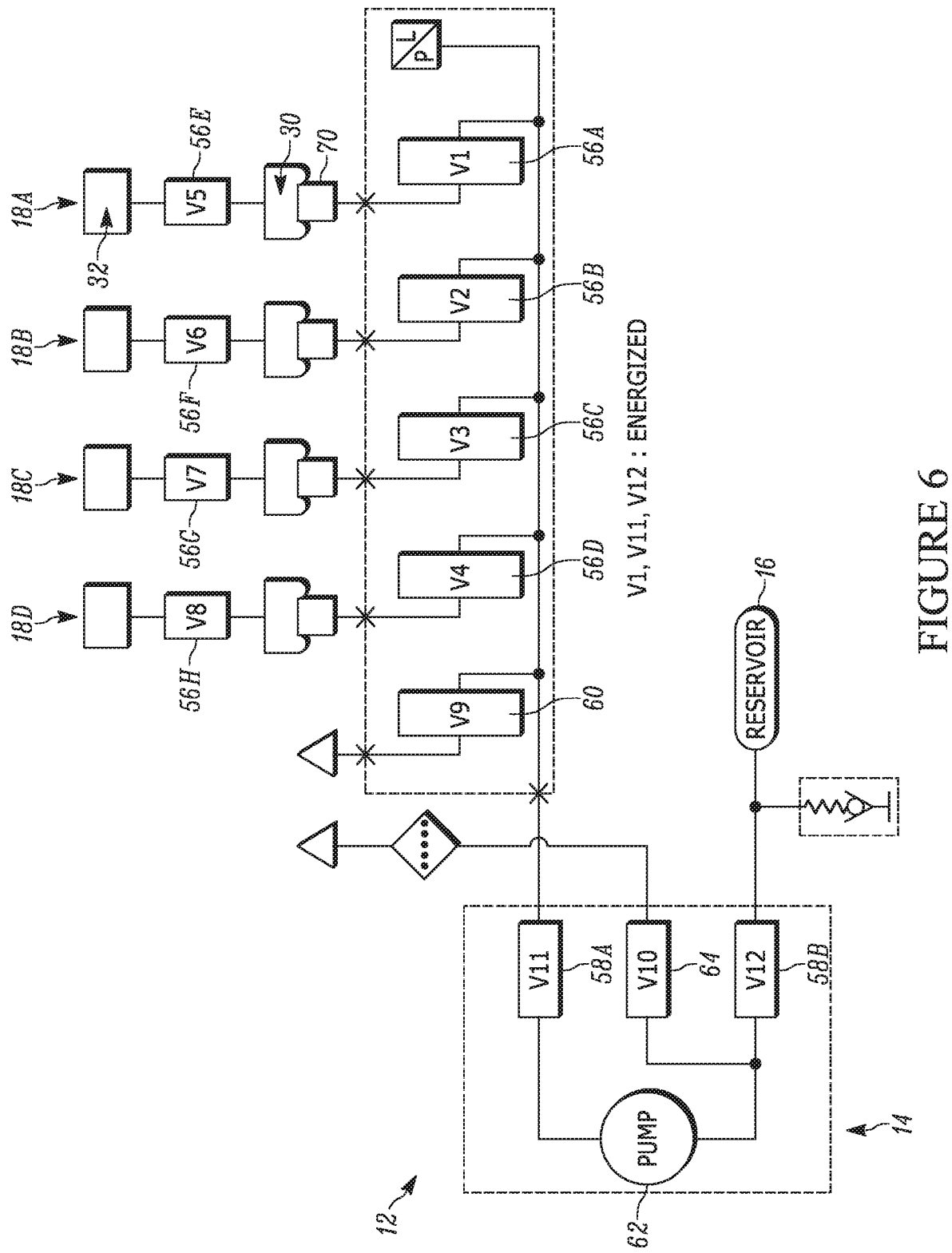
FIG. 6 is a diagram of a second embodiment of an air suspension system in a first mode of operation, according to embodiments of the present invention.
Figure 7:
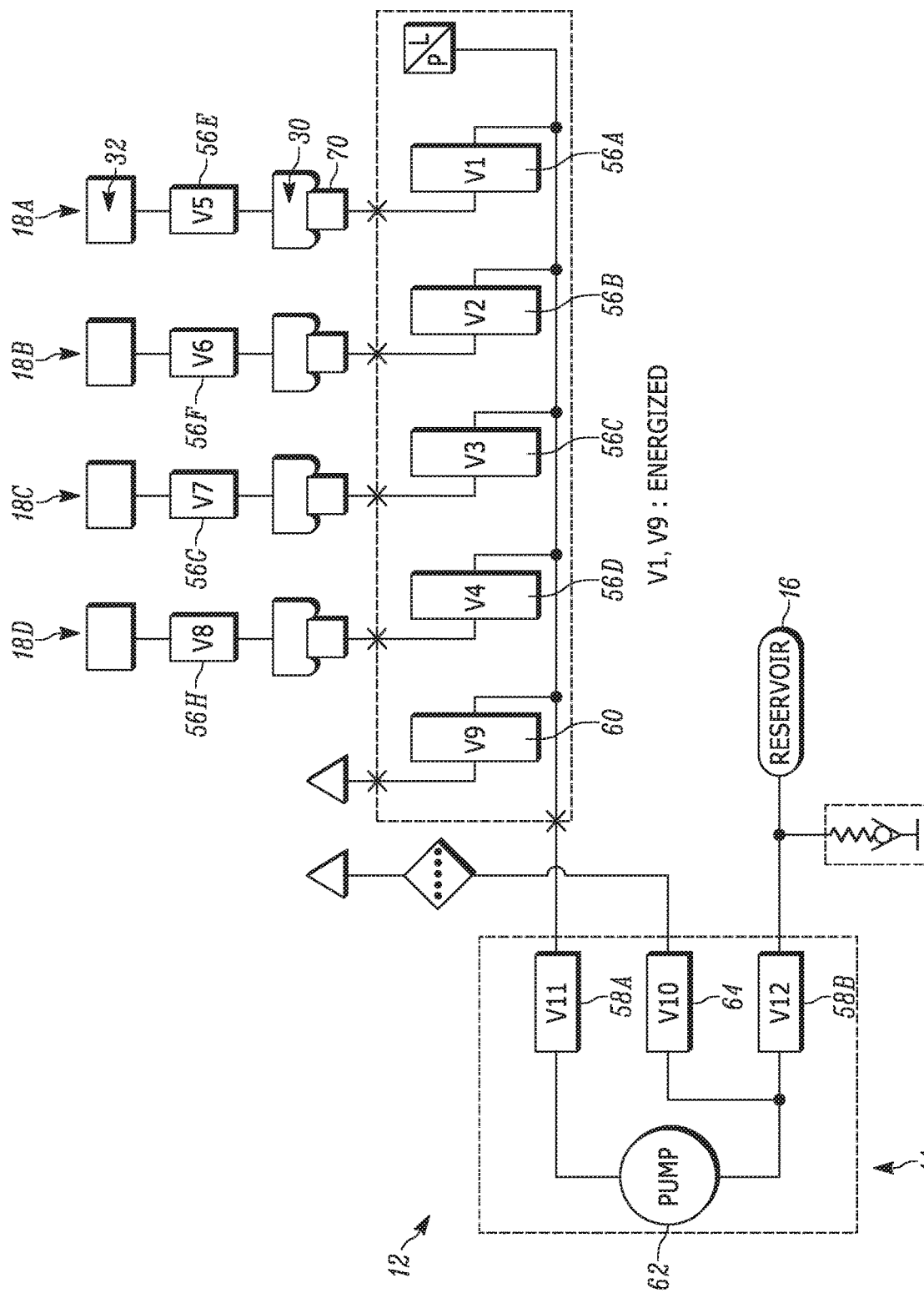
FIG. 7 is a diagram of a second embodiment of an air suspension system in a second mode of operation, according to embodiments of the present invention.
Figure 8:
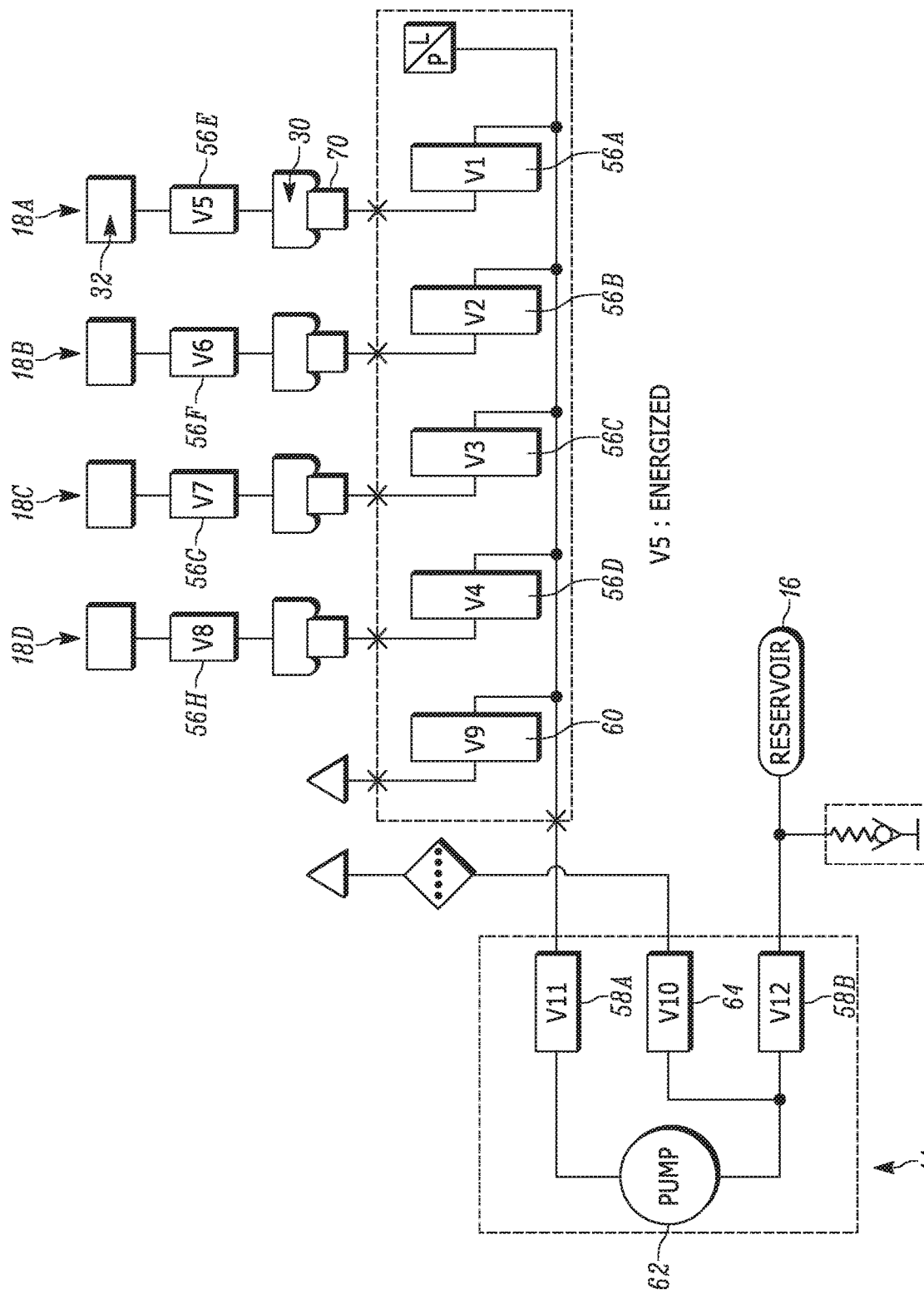
FIG. 8 is a diagram of a second embodiment of an air suspension system in a third mode of operation, according to embodiments of the present invention.

Another embodiment of the air spring assembly 18A is shown in FIGS. 5-8, with like numbers referring to like elements. In this embodiment of the air suspension system 12, each of the air spring assemblies 18A,18B,18C,18D has two cavities that are separated by a valve, which controls the flow of air between the two cavities. The air spring assembly 18A shown in FIG. 5 is a multi-chamber air spring assembly 18A, having different spring rates. A stiffer spring rate is achieved by reducing the air spring volume, which occurs when the valve is in a closed position, and a lower spring rate is achieved when the valve is in an open position. The second embodiment of the first air spring assembly 18A is shown in greater detail in FIG. 5 (and the second embodiment of the remaining air spring assemblies 18B,18C,18D is similar to the air spring assembly 18A shown in FIG. 5), and schematics of various configurations of the air suspension system 12 are shown in FIGS. 6-8.

In this embodiment, instead of the piston 36, there is a bottom cap portion 70, and the free end 40 of the bellow 24 is clamped between the clamping ring 42 and the bottom cap portion 70 as shown in FIG. 5. The bottom cap portion 70 is also connected to the vehicle axle 50.

The top cap 20 in the embodiment shown in FIG. 5 is also shaped differently, such that a portion of the bellow 24 is in contact with the outer surface 20A of the top cap 20. Disposed within the cavity 32 of the top cap 20 is a secondary valve 56E, and the secondary valve 56E is able to control the flow of air between the cavity 32 of the top cap 20 and the cavity 30 of the bellow 24, such that when the secondary valve 56E is in a closed position, the cavity 30 of the bellow 24 acts a first air volume, and the cavity 32 of the top cap 20 acts as a second air volume, and the cavities 30,32 are isolated from one another. As mentioned above, the air spring assembly 18A shown in FIG. 5 is a multi-chamber air spring assembly 18A, having different spring rates. A stiffer spring rate is achieved by reducing the air volume, which occurs when the secondary valve 56E is in a closed position, such that only the air volume in the cavity 30 of the bellow 24 affects the spring rate of the air spring assembly 18A. A lower spring rate is achieved by increasing the air volume, which occurs when the secondary valve 56E is in an open position such that the air volume in both the cavity 32 of the top cap 20 and the cavity 30 of the bellow 24 affect the spring rate of the air spring assembly 18A. The secondary valve 56E is in fluid communication with the fitting 54, as shown in FIG. 5, and the fitting 54 is in fluid communication with a first valve 56A, and the first valve 56A is in fluid communication with a first control valve 58A, similar to the previous embodiment. However, in alternate embodiments, the fitting 54 is in direct fluid communication with the cavity 32 of the top cap 20, and the secondary valve 56E still controls fluid communication between the cavity 32 of the top cap 20 and the cavity 30 of the bellow 24.

During travel of the vehicle, the air compressor 14 and the valves 56A,56E are used to configure the air pressure in the cavities 30,32, such that the air spring assembly 18A provides the desired ride quality, and the vehicle is traveling at the desired ride height. If the secondary valve 56E is in the closed position, the ride quality and ride height is determined by the pressure in the cavity 30 of the bellow 24 only. If the secondary valve 56E is in the open position, the ride quality and ride height is determined by the pressure in the combined volume of the cavity 30 of the bellow 24 the cavity 32 of the top cap 20.

Referring now to FIG. 6, the air suspension system 12 according to the second embodiment is shown in a first mode of operation, where the air suspension system 12 is configured to provide pressure relief of the first air spring assembly 18A shown in FIGS. 5 and 6. The secondary valve 56E is normally in an open position, in the configuration shown in FIG. 6. If the pressure in the cavity 30 of the bellow 24 of the first air spring assembly 18A is above a predetermined maximum value, in the example shown in FIG. 6, the first valve 56A, and the control valves 58A,58B are all energized, such that the first valve 56A and the control valves 58A,58B are placed in an open position, and the remaining valves 56B,56C,56D,60,64 are in a closed position. This allows air in the cavity 30 of the bellow 24 to pass through the first valve 56A, through the first control valve 58A, the pump 62, the second control valve 58B, and into the reservoir 16. The valves 56A,58A,58B may be opened at any time during operation of the vehicle when the pressure in the cavity 30 of the bellow 24 of the first air spring assembly 18A above a predetermined maximum allowable value.

Another example of a different mode of operation of the air suspension system 12 is shown in FIG. 7, where the air suspension system 12 is again configured to provide pressure relief of the first air spring assembly 18A shown in FIGS. 5 and 7. In this configuration, the secondary valve 56E is again in a closed position. If the pressure in the cavity 30 of the bellow 24 reaches a predetermined maximum value, in the configuration shown in FIG. 7 the first valve 56A and the venting valve 60 are both energized, such that the first valve 56A and the venting valve 60 are both in an open position, and the remaining valves 56B,56C,56D,58A,58B,64 are in a closed position. This allows air in the cavity 30 of the bellow 24 to pass through the first valve 56A, through the venting valve 60, and into the atmosphere. The valves 56A,60 may be opened at any time during operation of the vehicle when the pressure in the cavity 30 of the bellow 24 of the first air spring assembly 18A is above the predetermined maximum allowable value.

Referring now to FIG. 8, another mode of operation of the air suspension system 12 is shown, where the air suspension system 12 is again configured to provide pressure relief of the first air spring assembly 18A shown in FIGS. 5 and 8. In this configuration, the valves 56A,56B,56C,56D,58A,58B,60,64 are in a closed position. If there is excess pressure in the cavity 30 of the bellow 24 of the first air spring assembly 18A, in the example shown in FIG. 8, the secondary valve 56E, is energized, such that the secondary valve 56E is placed in an open position, and the remaining valves 56A,56B,56C,56D,58A,58B,60,64 are in a closed position. This allows air in the cavity 30 of the bellow 24 to pass into the cavity 32 of the top cap 20, such that the cavity 32 of the top cap 20 functions as an additional reservoir. The valves 56F,58G,58H may be opened at any time during operation of the vehicle when the pressure in the cavity 30 of the bellow 24 of the other air spring assemblies 18B,18C,18D is above the predetermined maximum allowable value, such that each cavity 32 of the top cap 20 of each air spring assembly 18B,18C,18D is able to be used as an additional reservoir.

The valves 56E,56F,58G,58H in the embodiment described in FIGS. 5-8 are electromechanical solenoid type valves, which default to a closed position when they are not energized, and change to an open position when energized. It is also within the scope of the invention that the valves 56E,56F,58G,58H may also be mechanical valves, such as a check valve, which default to a closed position, and open when the amount of pressure in the cavities 30,32 is above the predetermined maximum allowable value.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An apparatus, comprising:
an air suspension system, including:
at least one air spring assembly, comprising:
a bellow;
a first cavity formed as part of the bellow:
a top cap connected to the bellow;
a second cavity formed as part of the top cap;
at least one valve in fluid communication with the first cavity and the second cavity, the at least one valve for controlling the flow of air into and out of the first cavity and the second cavity;

a reservoir;
wherein during a first mode of operation, the air spring assembly is configured such that when the pressure in the first cavity and the second cavity is above a predetermined value, the at least one valve is placed in an open position, and air from the first cavity and the second cavity is vented to the reservoir, and during a second mode of operation, the air spring assembly is configured such that when the pressure in the first cavity and the second cavity is above the predetermined value, the at least one valve is placed in the open position, and air from the first cavity and the second cavity is vented to the atmosphere.

2. The apparatus of claim 1, further comprising:
a venting valve in fluid communication with the at least one valve, and the atmosphere;
wherein during the first mode of operation, the venting valve is in a closed position, and during the second mode of operation, the venting valve is placed in an open position, allowing air in the first cavity and the second cavity to flow through the first valve, the venting valve, and vent to the atmosphere.

3. The apparatus of claim 1, the reservoir further comprising:
a tank in fluid communication with the at least one valve;
wherein during the first mode of operation, air is transferred from the first cavity and the second cavity, through the first valve and to the reservoir.

4. The apparatus of claim 1, the at least one valve further comprising an electromechanical valve or a mechanical valve.

5. The apparatus of claim 1, the second cavity further comprising the reservoir.

6. The apparatus of claim 5, air spring assembly further comprising:
a secondary valve in fluid communication with the first cavity and the reservoir, such that the secondary valve controls air flow between the first cavity and the reservoir;
wherein during a third mode of operation, the secondary valve is placed in an open position when the pressure in the first cavity is above the predetermined value, and during the first mode of operation and the second mode of operation, the secondary valve is placed in a closed position.

7. The apparatus of claim 5, the secondary valve further comprising an electromechanical valve or a mechanical valve.

8. An air suspension system having a maximum pressure relief function, comprising:
at least one air spring assembly, comprising:
a bellow;
a first cavity formed as part of the bellow;
a top cap connected to the bellow;
a second cavity formed as part of the top cap;
a first valve in fluid communication with the first cavity and the second cavity;
at least one venting valve in fluid communication with the first valve;
a reservoir in fluid communication with the first valve;
a first mode of operation, and during the first mode of operation, the air spring assembly is configured such that when pressure in the first cavity and the second cavity is above a predetermined maximum value, the first valve is placed in an open position such that air from the first cavity and the second cavity is vented to the reservoir; and
a second mode of operation, and during the second mode of operation, the air spring assembly is configured such that when pressure in the first cavity and the second cavity is above a predetermined maximum value, the first valve is placed in the open position and the at least one venting valve is placed in an open position such that air from the first cavity and the second cavity is vented to the atmosphere;
wherein during the first mode of operation, the venting valve is in a closed position.

9. The air suspension system of claim 8, further comprising:
an air compressor in fluid communication with first valve and the reservoir, the air compressor operable for increasing the pressure in the first cavity and the second cavity;
wherein during the first mode of operation, air from the first cavity and the second cavity passes through the first valve, through the air compressor, and into the reservoir.

10. The air suspension system of claim 8, further comprising:
a secondary valve in fluid communication with the first cavity and the second cavity, such that the secondary valve controls air flow between the first cavity and the second cavity; and
a third mode of operation, during the third mode of operation, the air spring assembly is configured such that when pressure in the first cavity is above a predetermined maximum value, the secondary valve is placed in an open opposition such that air from the first cavity is vented to the second cavity;
wherein during the third mode of operation, the venting valve is in a closed position, and the first valve is in a closed position.

* * * * *